(12) United States Patent
McKee (10) Patent No.: US 7,728,896 B2
(45) Date of Patent: Jun. 1, 2010

(54) DUAL CONVERSION GAIN GATE AND CAPACITOR AND HDR COMBINATION

(75) Inventor: Jeffrey A. McKee, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 961 days.

(21) Appl. No.: 11/178,324

(22) Filed: Jul. 12, 2005

(65) Prior Publication Data

US 2007/0013797 A1    Jan. 18, 2007

(51) Int. Cl.
*H04N 3/14* (2006.01)
*H04N 5/335* (2006.01)

(52) U.S. Cl. .................. 348/308; 348/222.1; 348/241

(58) Field of Classification Search ............. 348/308, 348/222.1; 250/208.1; 341/155; 345/82; 257/225

See application file for complete search history.

(56) References Cited

U.S. PATENT DOCUMENTS

| | | | |
|---|---|---|---|
| 5,955,753 A | 9/1999 | Takahashi | |
| 6,107,655 A | 8/2000 | Guidash | |
| 6,160,281 A | 12/2000 | Guidash | |
| 6,218,656 B1 | 4/2001 | Guidash | |
| 6,352,869 B1 | 3/2002 | Guidash | |
| 6,423,994 B1 | 7/2002 | Guidash | |
| 6,507,365 B1 | 1/2003 | Nakamura et al. | |
| 6,552,323 B2 | 4/2003 | Guidash et al. | |
| 6,657,665 B1 | 12/2003 | Guidash | |
| 6,747,694 B1 | 6/2004 | Nishikawa et al. | |
| 6,947,088 B2 | 9/2005 | Kochi | |
| 2002/0018131 A1* | 2/2002 | Kochi | 348/304 |
| 2003/0179304 A1* | 9/2003 | Kuroda et al. | 348/304 |
| 2004/0080648 A1* | 4/2004 | Rhodes | 348/308 |
| 2004/0251394 A1 | 12/2004 | Rhodes et al. | |
| 2005/0110093 A1 | 5/2005 | Altice, Jr. et al. | |
| 2005/0167574 A1 | 8/2005 | He | |

FOREIGN PATENT DOCUMENTS

EP    0865197    9/1998

* cited by examiner

*Primary Examiner*—David L Ometz
*Assistant Examiner*—Antoinette T Spinks
(74) *Attorney, Agent, or Firm*—Dickstein Shapiro LLP (57) ABSTRACT

A pixel circuit having a shared control line for providing two control signals to the pixel array. One control line is used to provide a control signal to both a high dynamic range circuit and a dual conversion gain circuit to two pixel circuits. The pixel circuits each contain two pixel cells that have separate photo-conversion devices but share readout circuitry.

40 Claims, 9 Drawing Sheets

DUAL CONVERSION GAIN GATE AND CAPACITOR AND HDR COMBINATION

The invention relates generally to semiconductor imaging devices and in particular to a CMOS active pixel sensor ("APS") imager having an array of pixel cells and circuitry for the cells.

BACKGROUND OF THE INVENTION

Figure 1:
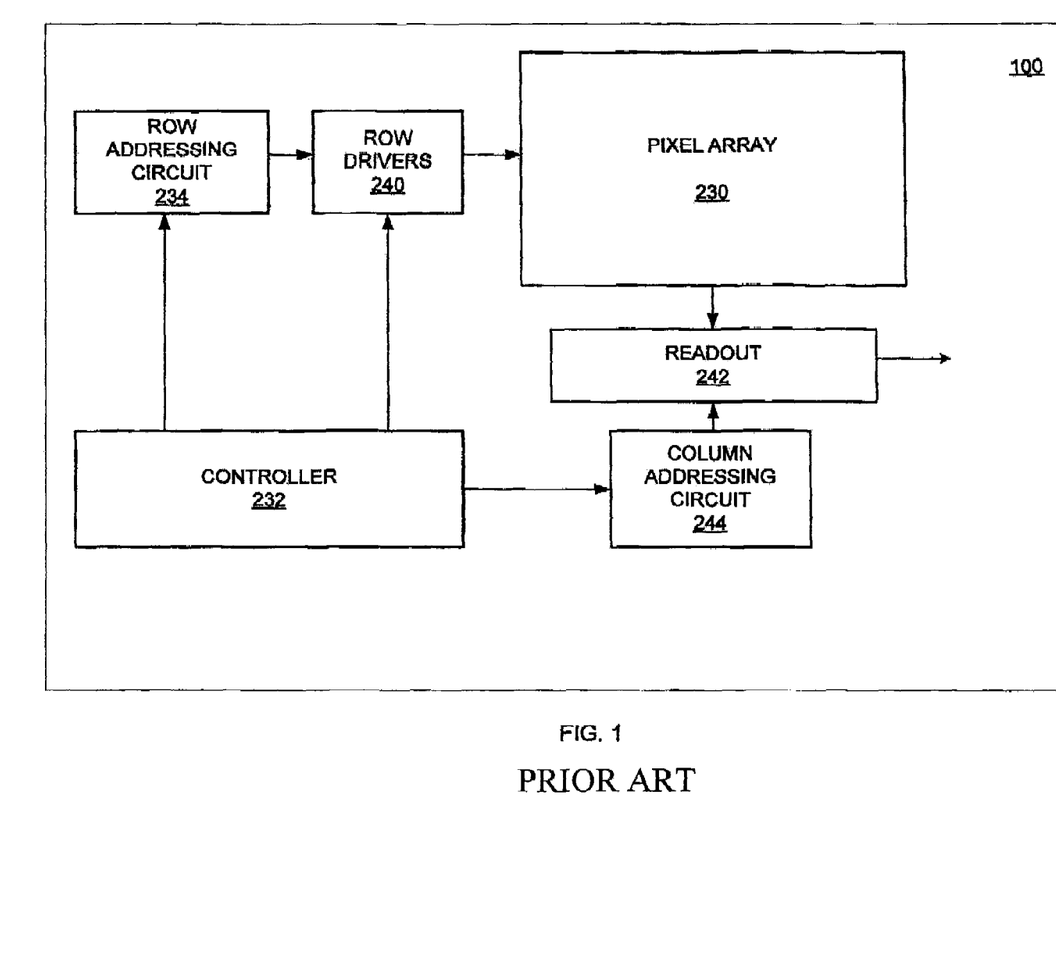
FIG. 1 is a block diagram of a conventional APS system.

There is a current interest in CMOS active pixel sensor imagers for use as low cost imaging devices. FIG. 1 shows a signal processing system 100 that includes a CMOS active pixel sensor ("APS") pixel array 230 and a controller 232 that provides timing and control signals to enable the read out of signals stored in the pixels in a manner commonly known to those skilled in the art. Exemplary arrays have dimensions of M×N pixels, with the size of the array 230 depending on a particular application. The imager pixels are readout a row at a time using a column parallel readout architecture. The controller 232 selects a particular row of pixels in the array 230 by controlling the operation of row addressing circuit 234 and row drivers 240. Signals stored in the selected row of pixels are provided on column lines to a readout circuit 242. The pixel signals read from each of the columns are then readout sequentially using a column addressing circuit 244.

Figure 2:
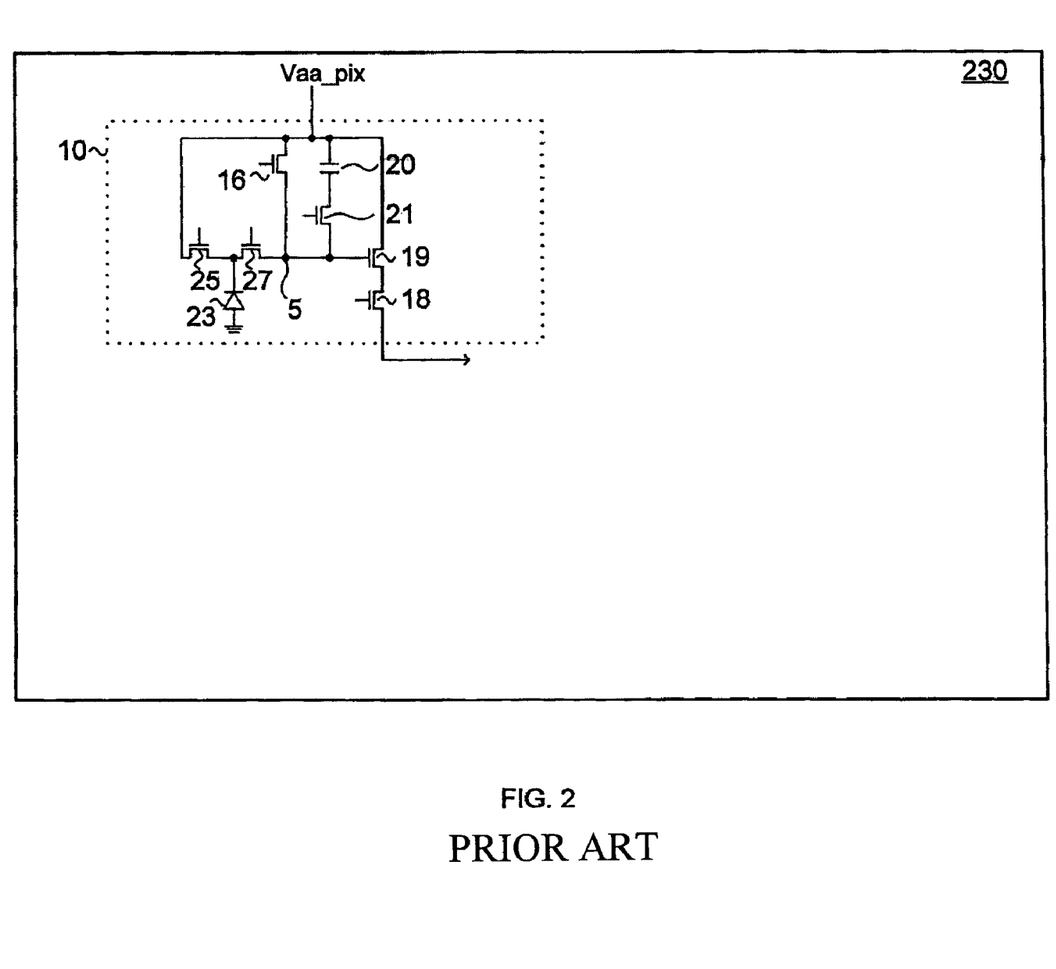
FIG. 2 is a schematic diagram of a portion of a pixel array of FIG. 1.

FIG. 2 shows the pixel array 230 of the system 100 of FIG. 1 in greater detail. FIG. 2 illustrates a six transistor (6T) CMOS pixel cell 10 in the pixel array 230. The 6T CMOS pixel cell 10 generally comprises a photo-conversion device 23 for generating and collecting charge generated by light incident on the pixel cell 10, and a transfer transistor 27 for transferring charge from the photo-conversion device 23 to a sensing node, typically a floating diffusion region 5. The floating diffusion region 5 is electrically connected to the gate of an output source follower transistor 19. The pixel cell 10 also includes a reset transistor 16 for resetting the floating diffusion region 5 to a predetermined voltage (shown as the array pixel supply voltage Vaa_pix); and a row select transistor 18 for outputting a signal from the source follower transistor 19 to an output column line in response to a row select signal. Although not required, in this exemplary pixel cell 10, a capacitor 20 may also be included to increase the charge storage capacity of floating diffusion region 5. One plate of the capacitor 20 is coupled to Vaa_pix and the other plate of the capacitor 20 is coupled to the floating diffusion region 5 through a dual conversion gain ("DCG") transistor 21. Although also not required, in this exemplary pixel 10, a high dynamic range ("HDR") transistor 25 is included. One source/drain of HDR transistor 25 is coupled to Vaa_pix and the other source/drain of the HDR transistor 25 is coupled to the photo-conversion device 23.

In the CMOS pixel cell 10 depicted in FIG. 2, electrons are generated by light incident on the photo-conversion device 23. These charges are transferred to the floating diffusion region 5 by the transfer transistor 27 when the transfer transistor 27 is activated. The source follower transistor 19 produces an output signal based on the transferred charges. The output signal is proportional to the number of electrons extracted from the photo-conversion device 23. When DCG transistor 21 is enabled, capacitor 20 is coupled to the floating diffusion region 5 and increases the storage capability and charges the conversion gain of floating diffusion region 5. When HDR transistor 25 is enabled, Vaa_pix is coupled to the photo-conversion device 23 and drives some charges away from the photo conversion device 23 which increases the dynamic range of pixel cell 10.

It is desirable to increase the fill factor and charge storage capacity of the pixels 10 in the array 230. However, the inclusion of a capacitor 20 and DCG transistor 21 and the control lines to control them requires space in the pixel 10 and/or in the array 230. Additionally, the HDR transistor 25 (to increase the dynamic range) requires space in the pixel 10 and/or in the array 230. There is a tradeoff of space: the greater space consumed by capacitors and the transistors, the less space available for the photo-conversion device 23. As such, including capacitors and transistors and the control lines to control them in the array 230 affects the fill factor of the array 230. Therefore, it is desirable to include controllable capacitors and transistors to increase charge storage capacity and dynamic range without significantly effecting the fill factor of the array 230.

BRIEF SUMMARY OF THE INVENTION

The present invention provides a method and apparatus for more efficient capacitor placement and metal routing in pixels employing dual conversion gain (DCG) and high dynamic range (HDR) transistors.

In one aspect of the invention, one activation circuit is shared by a DCG transistor and an HDR transistor.

In another aspect of the invention, the shared activation circuit includes a common gate for DCG and HDR transistors.

In another aspect of the invention, the common gate also provides one plate of a capacitor employed in a dual conversion gain circuit.

In another aspect of the invention, a plurality of pixels forming a pixel circuit has respective HDR transistors activated by a shared activation circuit which share a readout circuit.

In another aspect of the invention, a shared activation circuit is provided for a plurality of HDR transistors in one pixel circuit formed by a pair of pixels and a DCG circuit for a different pixel circuit formed by another pair of pixels.

BRIEF DESCRIPTION OF THE DRAWINGS

These and other features and advantages of the invention will be more readily understood from the following detailed description of the invention which is provided in connection with the accompanying drawings, in which.

DETAILED DESCRIPTION OF THE INVENTION

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical, or other changes may be made to the specific embodiments disclosed without departing from the spirit and scope of the present invention.

Figure 3:
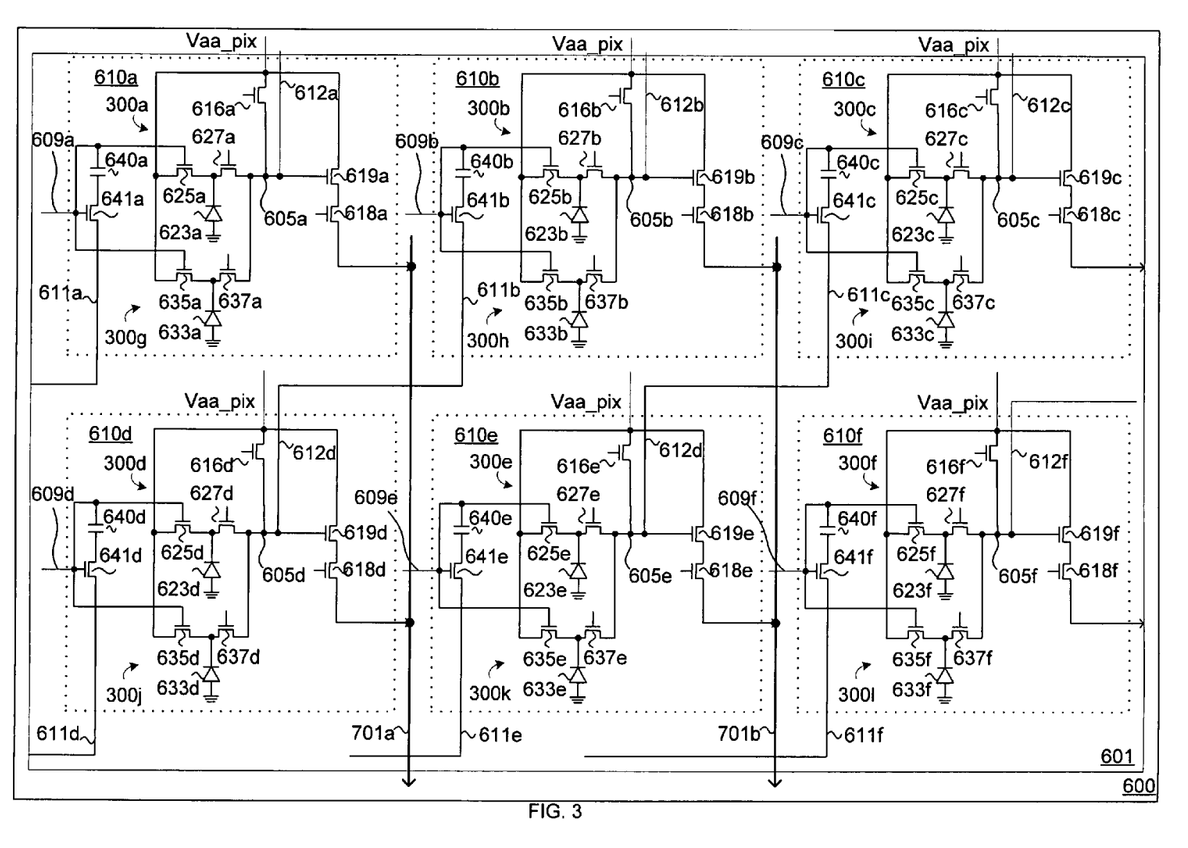
FIG. 3 is a schematic diagram of a portion of a pixel array in accordance with an exemplary embodiment of the invention.

FIG. 3 shows an exemplary embodiment of the invention in the form of an imaging device 600 that combines the control signal lines for high dynamic range and dual conversion gain transistors to reduce the space required in the device 600. Imaging device 600 includes pixels 300a through 300l in accordance with the illustrated embodiment of the invention. Pixels 300a and 300g, 300b and 300h, 300c and 300i, 300d and 300j, 300e and 300k, and 300f and 300l are part of respective identical pixel circuits 610a, 610b, 610c, 610d, 610e, 610f, which are part of pixel array 601. Taking pixel circuit 610b as representative, pixels 300b and 300h respectively include a photo-conversion device 623b 633b, and a transfer transistor 627b, 637b. Pixel circuit 610b also includes floating diffusion region 605b and reset transistor 616b, and readout circuitry, i.e., source follower transistor 619b and row select transistor 618b, which are shared by pixels 300b and 300h. Pixel circuit 610b also includes a DCG/HDR circuit that includes a transistor 641b and a capacitor 640b, and HDR transistors 625b, 635b. The DCG/HDR circuit is connected to pixel circuit 610b and 610d. Pixel circuits 610a, 610c, 610d, 610e, 610f are similarly constructed as pixel circuit 610b.

The DCG/HDR circuitry of pixel circuit 610b is operated by a control line 609b for the HDR transistors 625b and 635b, but the capacitor is actually connected through DCG transistor 641b to the floating diffusion region 605d of a pixel circuit 610d to the left and below pixel circuit 610b. Likewise, the DCG/HDR circuitry of pixel circuit 610c is shared with circuit 610e, and so on throughout a pixel array. As seen in FIG. 3 with respect to pixel circuit 610b as representational of the other pixel circuits 601a, 610c, 610d, 610e, and 610f, DCG/HDR circuitry is shared with a diagonally located pixel circuit, one pixel circuit row below and one pixel circuit column over, i.e., pixel circuits 610b and 610d. The floating diffusion region 605d of pixel circuit 610d is switchingly coupled to capacitor 640b in pixel circuit 610b by DCG transistor 641b. The same sharing of DCG/HDR circuit applies to pixel circuits 601a, 610c, 610d, 610e, and 610f, although not all neighboring pixel circuits are shown in FIG. 3. Therefore, a DCG/HDR control signal carried on line 609b not only controls HDR transistors 625b, 635b of pixel circuit 610b, which switchingly couples photo-conversion devices 623b, 633b to Vaa_pix, but also controls DCG transistor 641b, which switchingly couples capacitor 640b of pixel circuit 610b to the floating diffusion region 605d of pixel circuit 610d. The capacitor 640b of pixel circuit 610b stores a charge with the floating diffusion region 605d of pixel circuit 610d through switch 641b of pixel circuit 610b, line 611b, and line 612d. As such, the control signal carried on line 609b controls two different circuits: the HDR transistors 625b, 635b in pixel circuit 610b and the DCG transistor 641b, which couples capacitor 640b to the floating diffusion region 605d of pixel circuit 610d. Thus, the DCG signal for a pixel circuit row is the same signal used for the HDR signal of the previous pixel circuit row. Although the invention is described with reference to sharing control signals between diagonally located pixel circuits—i.e., one pixel circuit row and one pixel circuit column apart, the invention is not so limited.

It is conventionally known during the manufacture of imaging devices such as imaging device 600 to include dummy pixels and dummy pixel circuits around the periphery of the pixel array 601. Although not shown, pixel circuits on the edge of a pixel array 601 are coupled to dummy pixel circuits to maintain the consistency of the diagonally-shared charges and control signals. For example, if pixel circuit 610b is located on the top edge of the pixel array 601, then pixel circuit 610b shares a capacitor connected to line 612b in a dummy pixel circuit one column over to the right and one pixel circuit row above pixel circuit 610b.

With the pixels circuits (e.g., 610b, 610d) sharing circuitry and control signals, the amount of circuitry required and space needed in and around the pixel array 601 to operate the pixel array 601 is reduced. As such, the pixel array 601 of imaging device 600 includes HDR and DCG circuits and can take advantage of the benefits that accompany the inclusion of the HDR and DCG circuits without significantly affecting the fill factor of the pixel array 601.

Figure 4:
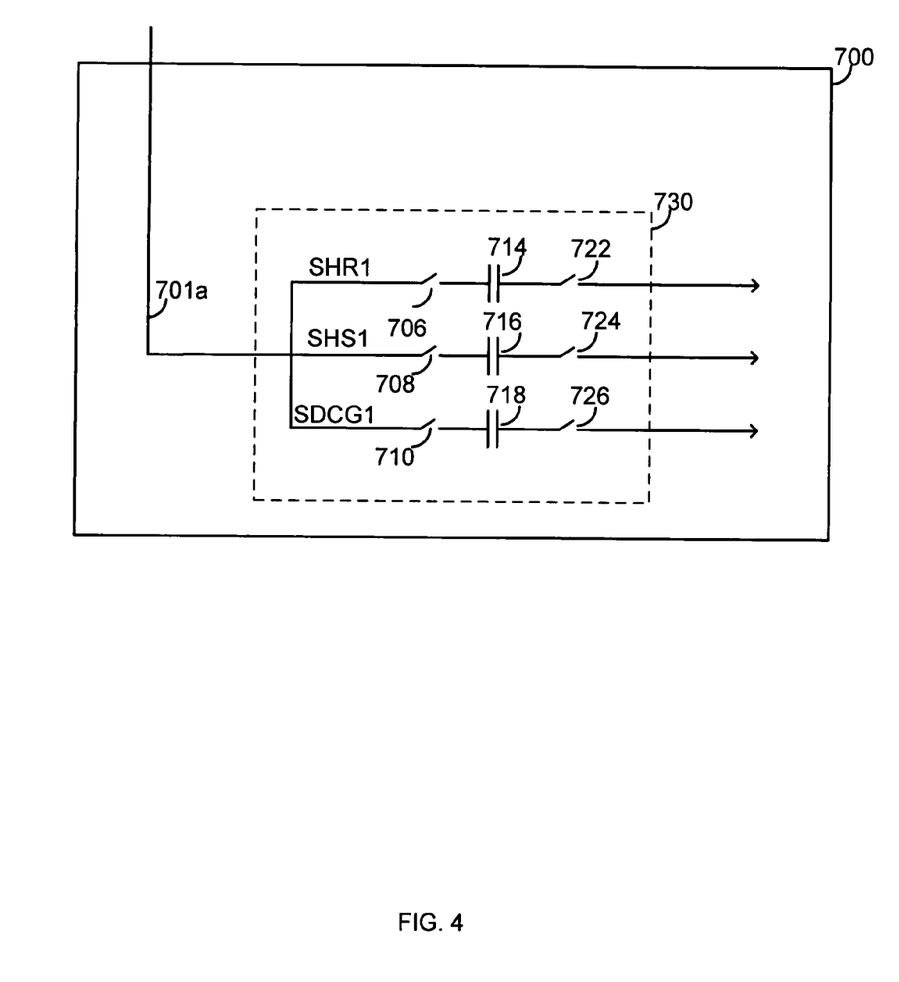
FIG. 4 is a schematic diagram of a portion of a sample and hold circuit in accordance with an exemplary embodiment of the invention.

Pixel circuits in a pixel circuit common column share a readout column line 701, e.g. 701a, 701b, and are coupled to a shared sample and hold circuit 700 (FIG. 4). In an exemplary embodiment, signals are read from the pixel array 601 (FIG. 3) pixel row by pixel row starting with the top pixel row and proceeding incrementally to the bottom pixel row. For example, pixels 300a, 300b, and 300c would be readout at substantially the same time. Then pixels 300g, 300h, and 300i would be readout at substantially the same time. Then pixels 300d, 300e, and 300f would be readout at substantially the same time. The row by row readout of the pixel array continues until the last row of the array.

Three signals are readout from each pixel: Vrst—the reset signal, Vsig—the charge signal, and Vdcg—the second charge or dual conversion gain signal. Operation of the pixel array is described in greater detail below. Depending on the type of shutter used, a read ahead integration may be employed, as discussed more fully below.

FIG. 4 is a schematic diagram of a portion of a sample and hold circuit 700 in accordance with an exemplary embodiment of the invention. Although only one sample and hold circuit 700 is depicted, sample and hold circuit 700 is representative of a sample and hold circuit 700 for each column of pixel circuits in the pixel array. As indicated above, in an exemplary embodiment three signals are read out from each pixel, e.g., Vrst1, Vsig1, Vdcg1.

In an exemplary embodiment as seen in FIG. 4, each of the three signals received from the associated pixel circuit are separately stored in the sample and hold circuit 700. Sample and hold circuit 700 has a subcircuit 730 for storing signals from the pixel. Subcircuit 730 has three capacitors 714, 716, 718 for storing signals Vrst1, Vsig1, Vdcg1. Capacitors 714, 716, 718 are selectively coupled to the column line 701a through switches 706, 708, 710, respectively, which are controlled by control signals SHR1, SHS1 and SDCG1. Capacitors 714, 716, 718 are selectively coupled to downstream circuitry through switches 722, 724, 726, respectively.

The stored Vrst, Vsig, Vdcg signals can be read out and if preferred, combined, in many different ways. For example, in an exemplary embodiment, an external circuit (not shown)

controls switches of the sample and hold circuit 700 depending on the value of the value Vsig. For example, a threshold value is established (usually during manufacture), where the threshold is indicative of an abundance of signal value that has occurred during pixel readout, thus a dual conversion gain transformation may be applied. During readout, the Vsig is compared to the threshold value. If Vsig>threshold then the pixel output signal is Vrst−Vdcg. Otherwise, the output signal is Vrst−Vsig. Thus, for example, if the stored signals of subcircuit 730 are to be combined in a differential amplifier (not shown) coupled to the sample and hold circuit 700 and Vsig1 is greater than the threshold, then switches 724 and 726 are closed and capacitors 716 and 718 are coupled with the differential amplifier. If Vsig1 is not greater than the threshold, then switches 722 and 726 are closed and capacitors 714 and 718 are coupled with the differential amplifier.

Figure 5:
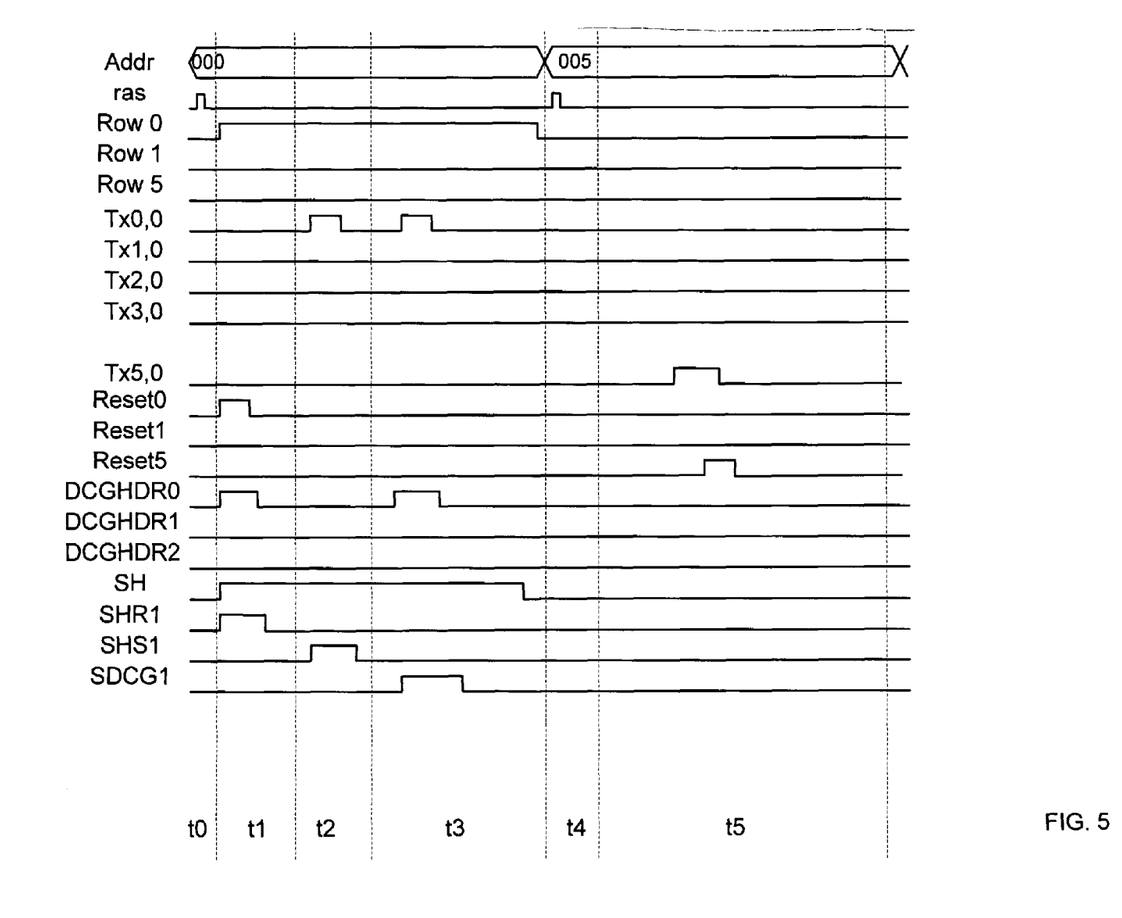
FIG. 5 is a timing diagram depicting a partial operation of the pixel array of FIG. 3 and the sample and hold circuit of FIG. 4 in accordance with an exemplary embodiment of the invention.

FIG. 5 is a timing diagram depicting a partial operation of the pixel array 601 of FIG. 3 and the sample and hold circuit 700 of FIG. 4 in accordance with an exemplary embodiment of the invention. For simplicity, the readout of one pixel is depicted and is representational of the other pixels being readout. In the timing diagram of FIG. 5, the signals are active "high," i.e., high logic state. A "Row" is a row of pixels e.g., 300a, 300b, 300c (FIG. 3). The first row of pixels is Row 0, e.g., pixels 300a, 300b, 300c (FIG. 3); the second row of pixels is Row 1, e.g., 300g, 300h, 300i (FIG. 3). Row 5 is not depicted in FIG. 3, but is described as part of the timing diagram of FIG. 5.

In FIG. 5, Addr is the pixel circuit row address of the pixel row being readout and ras is the read address signal. ROW 0, ROW 1, and ROW 5 are representational of the row select gate signals for pixel rows 0, 1, and 5, respectively. In implementation, a global row select signal is provided to the row decode circuitry, which AND's the row select signal with the Addr signal to provide the row select gate signal to the appropriate row. For example, if Addr is "000", then the row decode provides a row select gate signal to row 0. Tx0,0, Tx1,0, Tx2,0, Tx3,0 and Tx5,0 are the representational transfer gate signals for row 0, first pixel, i.e., pixel 300a, row 1, first pixel, i.e., pixel 300g, row 2, first pixel, i.e., pixel 300d, row 3, first pixel, i.e., pixel 300j; row5, first pixel, (not shown). In implementation, global transfer gate signals are provided to the column decode circuitry, which decodes the global transfer gate signal and the current desired pixel column to provide the transfer gate signal to the appropriate column. For example, during pixel column read of the pixel array the column decode circuitry will generate a Tx signal, e.g., Txj,0 that will enable corresponding transfer gate in a $j^{th}$ row and first column. For example, during a first row, column read a Tx0,0 is enabled for pixel 300a. During a second pixel column read of the pixel array the column decode circuitry will provide an enable signal on the next Tx signal, e.g., Tx_,1 that will enable corresponding transfer gate. For example, during a first row, second column read a Tx0,1 is enabled for pixel 300b. Reset0, Reset1, and Reset5 are the representational reset gate signals for rows 0, 1, and 5, respectively. In implementation, a global reset signal is provided to the row decode circuitry, which AND's the reset signal with the Addr signal to provide the reset signal to the appropriate row. In this case, each pixel will receive two row signals. For example, pixel circuit 610a receives a row 0, and a row 1 signal, which collectively control row select transistor 618a. DCGHDR0, DCGHDR1, and DCGHDR2 are the representational DCG/HDR gate control signals for rows 0, 1, and 2. A DCGHDR of row 0 appears to apply to a gate in a different pixel circuit. For example, the DCGHDR signal for pixel 300d (and 300j) is DCGHDR2 (as it is in the third pixel row). However, the DCGHDR2 signal is applied to and controls a gate 641b in pixel circuit 610. In implementation, a global DCGHDR signal is provided to the row decode circuitry, which AND's the DCGHDR signal with the Addr signal to provide the DCGHDR signal to the appropriate DCGHDR gate.

In FIG. 5, SHR1, SHS1, and SDCG1 are the signals that enable the switches 706, 708, 710 to couple capacitors 714, 716, 718 to the column line 701a, respectively.

In FIG. 5, time period t0 indicates the initial setup time period during which the pixel circuit row address of the pixels cells to be readout is provided. In this example during t0, an Addr of 000 is provided which corresponds to the first pixel row of the first pixel circuit row (i.e., row 0). Although the example describes the readout from one pixel, e.g., pixel 300a, of one pixel circuit, e.g., pixel circuit 610a (FIG. 3), this example is representational of all of pixels in a pixel row of a pixel circuit row being readout at substantially the same time as is conventionally known.

During time period t1, pixel circuit 610a is reset and the reset charge is stored as follows. Control signals Row0, Reset0, DCGHDR0 and SHR1 are enabled (i.e., asserted high) (FIG. 5). The Row0 signal closes switch 618a and couples pixel circuit 610a to a column line (FIG. 3). The Reset0 signal closes switch 616a and couples Vaa_pix to the pixel circuit 610a (FIG. 3). The DCGHDR0 signal closes switch 641x (a switch in a pixel circuit 610x not illustrated in FIG. 3 that is similar to switch 641a, where pixel circuit 610x is one pixel circuit row above and one column to the right of pixel circuit 610a) and couples photo-conversion device 623a to the floating diffusion region 605a and the capacitor 640x (a capacitor in pixel circuit 610x not illustrated in FIG. 3 that is similar to capacitor 640a) through line 612a to a pixel circuit one row above and one row to the right of pixel circuit 610a. The SHR1 signal closes switch 706 and couples capacitor 714 to pixel circuit 610a through column line 701a. Thus at the end of time period t1, pixel circuit 610a is reset and the reset voltage of the pixel circuit 610a is stored in the sample and hold circuit 700. Control signals Reset0, DCGHDR0, and SHR1 are disabled (i.e., driven low) by the end of time. When DCGHDR0 is pulsed, the photo-conversion devices of previous pixel circuit row (not shown) are reset at the same time. As such, the integration time of the pixel array requires calculating the integration time to reflect two pixel circuit rows being accessed. Although discussed in terms of enabling and disabling a control signal, this series of actions may also be referred to as pulsing—asserting/deasserting—a control signal as is commonly known.

During time period t2, the integration charge (i.e., photosignal) of the pixel circuit 610a is readout and stored as follows. Control signals Tx0,0 and SHS1 are enabled (i.e., driven high). The Tx0,0 signal closes switch 627a and couples photo-conversion device 623a to the floating diffusion region 605a. The SHS1 signal closes switch 708 and couples capacitor 716 to pixel circuit 610a through column line 701a. The charge stored on floating diffusion region 605a is read out and stored on the capacitor 716. Thus at the end of t2, the signal voltage Vsig1 of the pixel circuit 610a is stored in the sample and hold circuit 700. Control signals Tx0,0 and SHS1 are disabled (i.e., driven low) by the end of time period t2 (FIG. 5).

During time period t3, any additional integration charge of the pixel circuit 610a is readout and stored as follows. Control signals Tx0,0 SDCG1, and DCGHDR0 are enabled (i.e., driven high). The Tx0,0 signal closes switch 627a and switch 641x (a switch in a pixel circuit 610x not illustrated in FIG. 3 that is similar to switch 641a, where pixel circuit 610x is one pixel circuit row above and one column to the right of pixel circuit 610a) and couples photo-conversion device 623a to the floating diffusion region 605a and the capacitor 640x (a capacitor in pixel circuit 610x not illustrated in FIG. 3 that is similar to capacitor 640a) through line 612a to a pixel circuit one row above and one row to the right of pixel circuit 610a. The SDCG1 signal closes switch 710 and couples capacitor 718 to pixel circuit 610a through column line 701a. The charge stored on floating diffusion region 605a and capacitor 640x is read out and stored on the capacitor 718. Thus at the end of t3, any additional signal voltage of the pixel circuit 610a is stored in the sample and hold circuit 700. Control signals Row 0, Tx0,0, SDCG1, and DCGHDR0 are disabled (i.e., driven low) by the end of time period t3 (FIG. 5). Thus pixel circuit 610a has been reset, integrated, readout and stored at the end of time period t3.

During time period t4 the integration process is commenced for a row five pixel rows ahead of Row0. As is commonly known, when a mechanical shutter is not used, a pixel circuit row of pixels is initiated for integration in advance of the readout. In the exemplary embodiment, a row is initiated five rows ahead of the current row being readout. As such, since Row0 has been readout, Row5 is then prepared for integration. Time period t4 indicates the initial setup time period during which the pixel circuit row address of the pixels cells to be initiated is provided. In this example during time period t4, an Addr of 005 is provided. Although the example describes the initiation of one pixel cell this is representational of all of pixels in a pixel row of a pixel circuit row being initiated at substantially the same time as is conventionally known.

In time period t5, control signals Reset5 and Tx5,0 are enabled (i.e., driven high) (FIG. 5). Pixel 300y (not illustrated in FIG. 3) is a pixel similar to pixel 300a and five pixel rows below pixel circuit 300a. The Reset5 signal closes switch 616y (a switch in pixel 300y not illustrated in FIG. 3 that is similar to switch 616a) and couples Vaa_pix to the pixel circuit 610y. The Tx5,0 signal closes switch 635y (a switch in pixel circuit 300y not illustrated in FIG. 3 that is similar to switch 635a) and couples photo-conversion device 633y (photo-conversion device in pixel circuit 300y not illustrated in FIG. 3 that is similar to photo-conversion device 633a) to Vaa_pix. Thus at the end of time period t5, pixel 300y is reset and ready for integration. Control signals Reset5 and Tx5,0 are disabled (i.e., driven low) (FIG. 5). After which, the pixel circuit 300y integrates.

As is conventionally known, a readout from a pixel array actually comprises a series of successive readouts. During initial readouts from the pixel array different adjustments and calculations may occur. For example, during the initial readouts exposure settings are adjusted. After a first readout of the pixel array, the values read from the array are computed and exposure is adjusted. A pixel array is readout a second time and the values read from the array are computed and exposure is again adjusted. The final, usable readout from the pixel array may occur after several initial readouts. As such, the pixel is readout in a rolling manner, i.e., that if pixel array has 100 rows and the pixel array is successively readout from row 0 to 99, then on subsequent readouts of the pixel array, row 0 is readout after row 99. Thus, in the present example when row 95 is being readout, row 0 (five rows ahead) is initiated for readout. While the invention describes a five row ahead initiation, the invention is not so limited.

Figure 6:
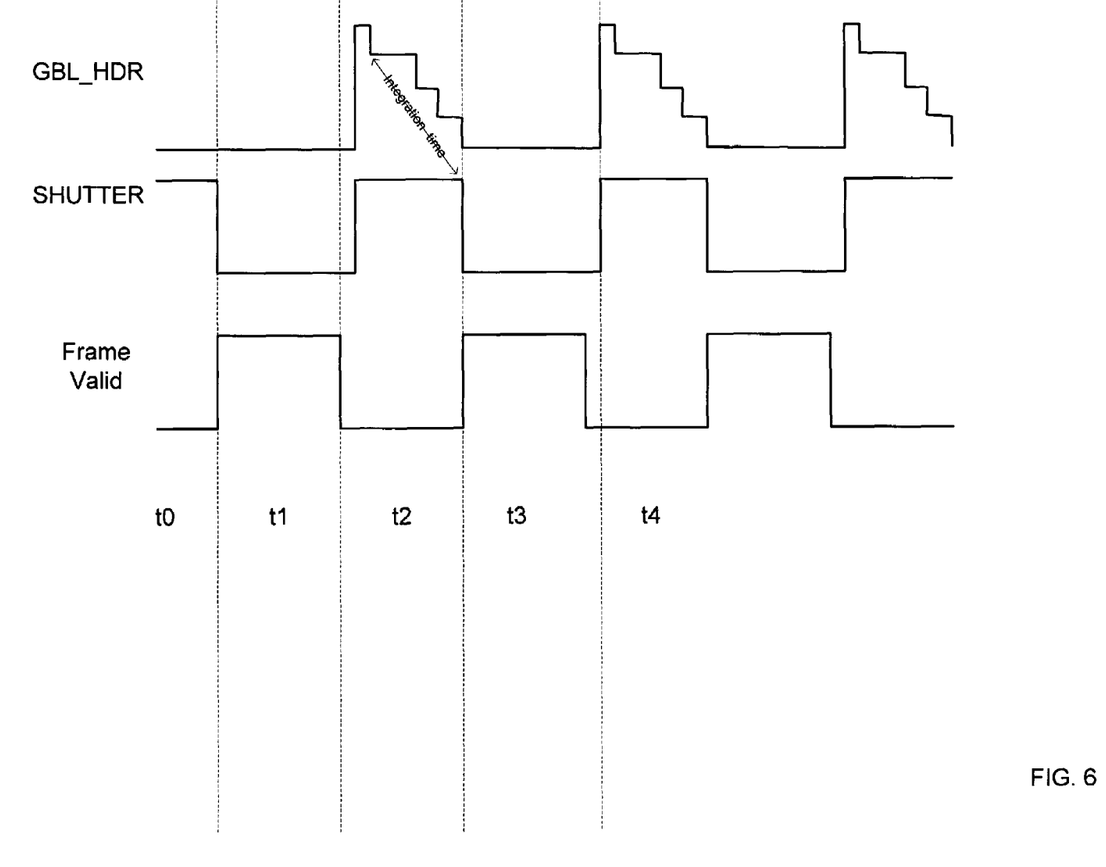
FIG. 6 is an additional timing diagram depicting a partial operation of the pixel array of FIG. 3 and the sample and hold circuit of FIG. 4 in accordance with an exemplary embodiment of the invention.

FIG. 6 is a timing diagram depicting a partial operation of the integration of pixel array of FIG. 3 in accordance with an exemplary embodiment of the invention. For simplicity, time periods t0, t1, t2, t3, t4 are referred to, but are not the same as the time periods t0, t1, t2, t3, t4 of FIG. 5. In the timing diagram of FIG. 6, the signals are active or enabled "high," i.e., high logic state.

GBL_HDR is the global control signal for the HDRDCG signal. This is combined (e.g., "ANDed") with the local address of a pixel row to provide the HDRDCG of the row. SHUTTER is the control signal for a mechanical shutter to control exposure of the pixel array. Frame Valid is the control signal that an imager typically produces to indicate to the image system that a valid image is being readout.

As depicted in FIG. 6, the system alternates between integrating charge, e.g., time periods t2, t4, and reading out signals, e.g., time periods t1, t3. During an integration time period, e.g., time period t2, a SHUTTER signal is enabled thereby temporary opening the mechanical shutter (not shown) of the pixel array. A GBL_HDR is enabled whereby the DCG_HDR transistors in the pixel array are enabled, i.e., closed. For example, the GBL_HDR enabled would close transistors 625, 635a in pixel circuit 610a, where pixel circuit 610a is representational of all of the pixel circuits, e.g., 610a, 610b, 610c, 610d, 610e, and 610f. The GBL_HDR varies over the integration time period t2, starting at a high level, where the pixels are reset and the level falls off, i.e., decreases, over time as the pixels integrate. At the end of time period t2, the GBL_HDR and the SHUTTER signals are disabled.

Figure 7:
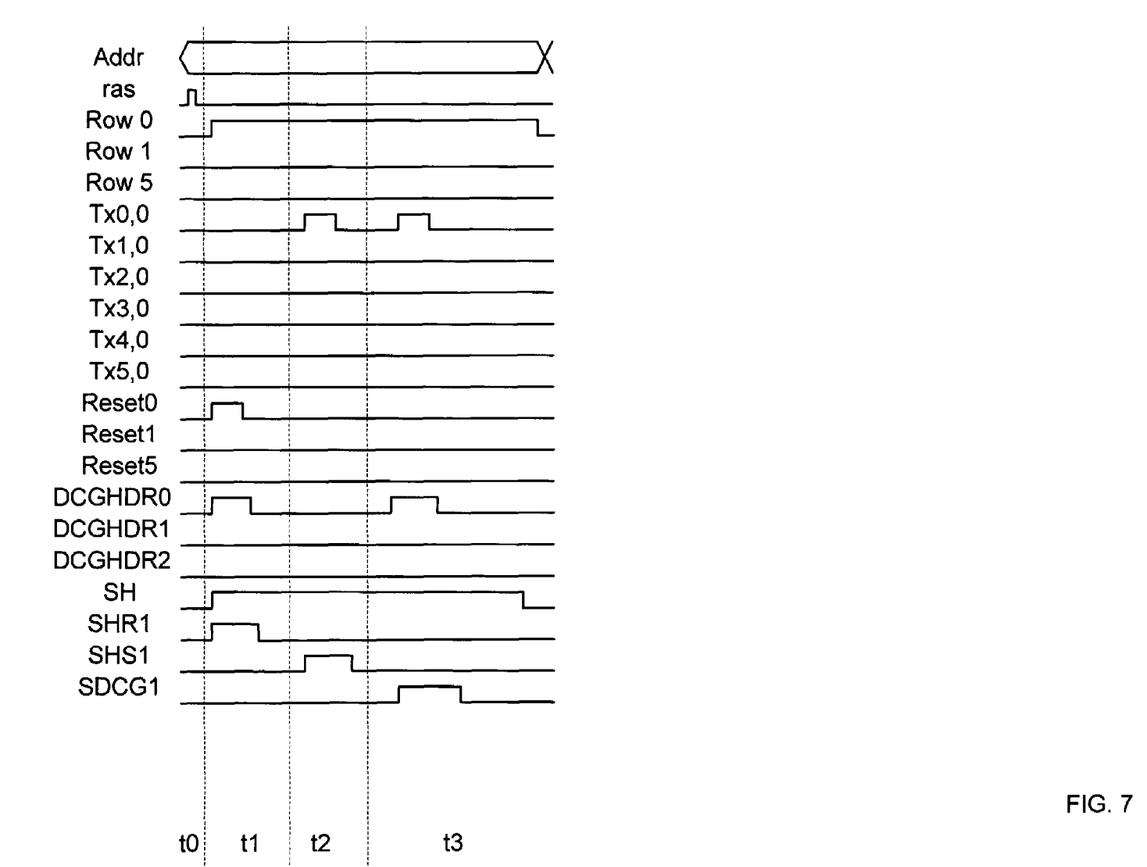
FIG. 7 is a timing diagram depicting a partial operation of the pixel array of FIG. 3 and the sample and hold circuit of FIG. 4 in accordance with another exemplary embodiment of the invention.

FIG. 7 is a timing diagram depicting a partial operation of the pixel array 601 of FIG. 3 and the sample and hold circuit 700 of FIG. 4 in accordance with another exemplary embodiment of the invention. The timing diagram of FIG. 7 is applicable to systems that use a mechanical shutter and thus, there is no need to start a row integration several rows before the pixel circuit row is readout. As such, the timing diagram of FIG. 7 is similar to the timing diagram of FIG. 5, but not does include initiation time periods t4 and t5 (FIG. 5).

Figure 8:
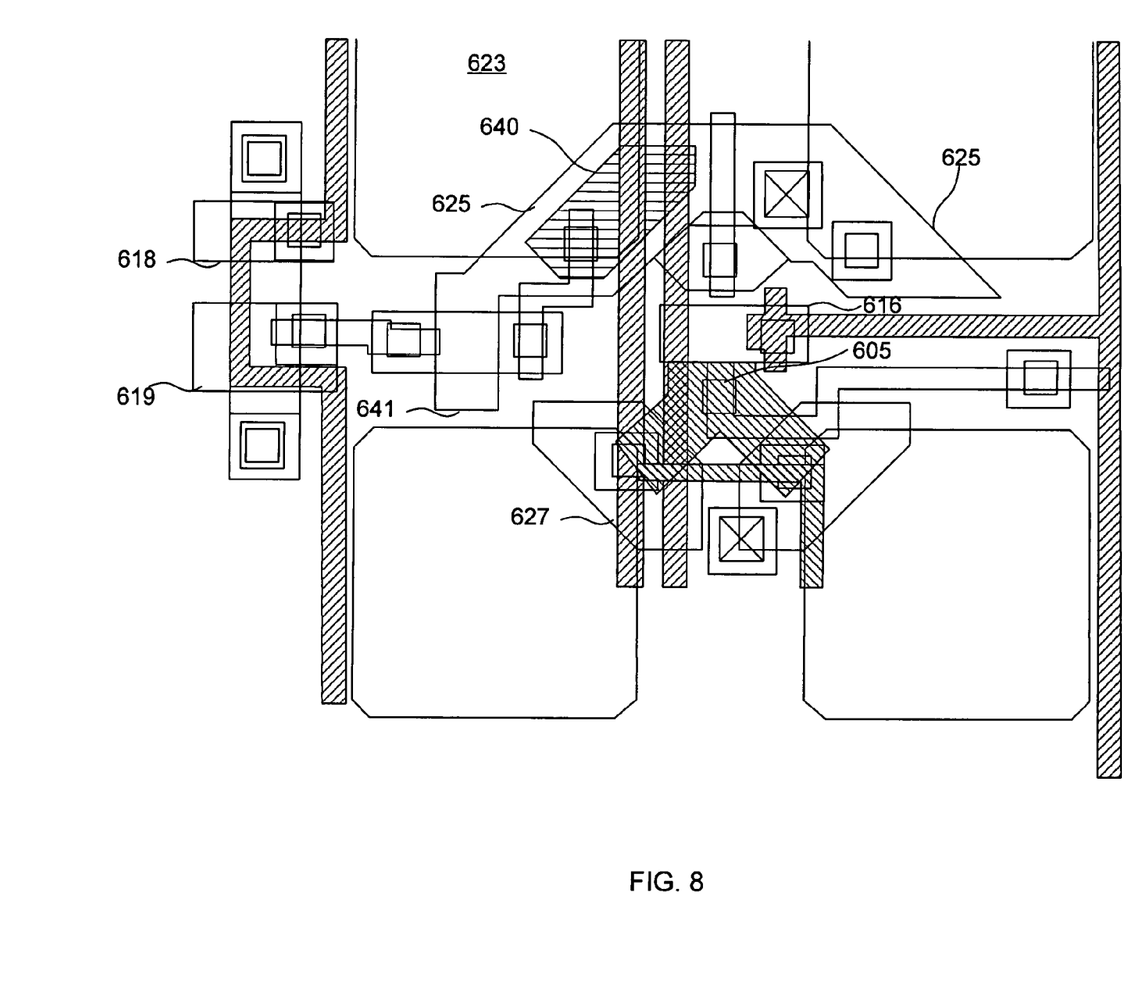
FIG. 8 is a plan view of a portion of the device of FIG. 3.

FIG. 8 shows a plan view of a circuit layout of a portion of the pixel array 601 of FIG. 3. FIG. 8 shows a row select transistor 618, source follower transistor 619, DCG transistor 641, HDR gate 625, transfer transistor 627, capacitor 640, reset transistor 616, floating diffusion region 605, and photo-conversion region 623.

Figure 9:
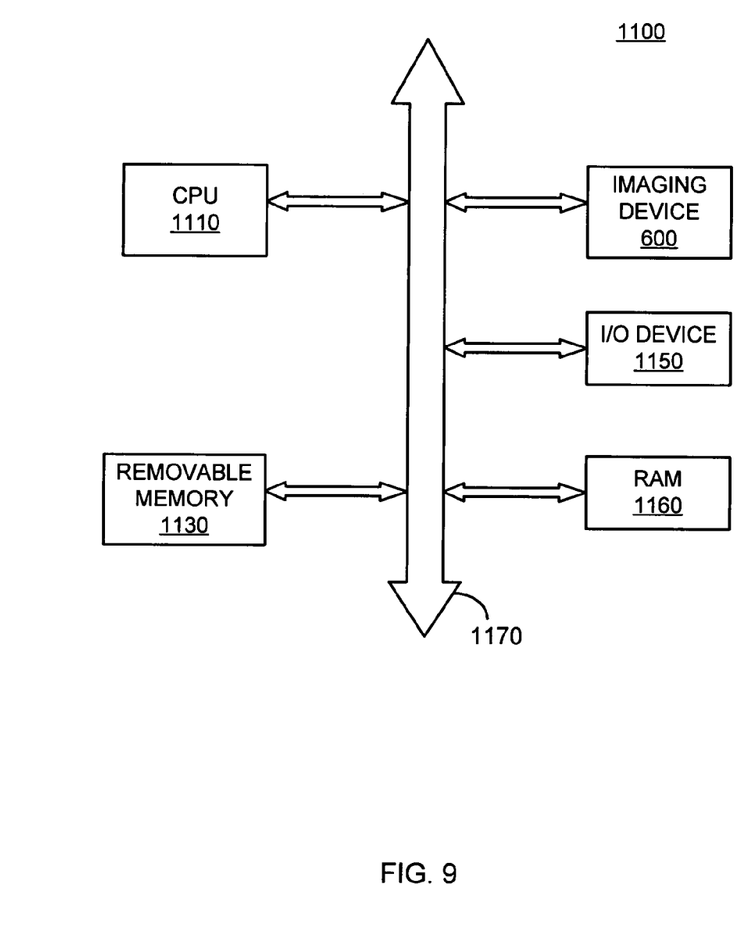
FIG. 9 is a block diagram showing a processor system incorporating at least one imaging device constructed in accordance with an embodiment of the invention.

FIG. 9 shows a system 1100, a typical processor system modified to include an imager device 600 (as constructed in FIG. 3). The system 1100 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other image acquisition or processing system.

System 1100, for example a camera system, generally comprises a central processing unit (CPU) 1110, such as a microprocessor, that communicates with an input/output (I/O) device 1150 over a bus 1170. Imaging device 600 also communicates with the CPU 1110 over the bus 1170. The system 1100 also includes random access memory (RAM) 1160, and can include removable memory 1130, such as flash memory, which also communicate with the CPU 1110 over the bus 1170. The imaging device 600 may be combined with a processor, such as a CPU, digital signal processor, or microprocessor, with or without memory storage on a single integrated circuit or on a different chip than the processor.

It should be appreciated that other embodiments of the invention include a method of manufacturing the circuit 1100. For example, in one exemplary embodiment, a method of manufacturing an CMOS readout circuit includes the steps of providing, over a portion of a substrate corresponding to a single integrated circuit, at least a pixel array with shared control lines (FIG. 3) as described above using known semiconductor fabrication techniques.

While the invention has been described and illustrated with reference to specific exemplary embodiments, it should be understood that many modifications and substitutions can be made without departing from the spirit and scope of the invention. For example, although the invention is described with reference to sharing DCG/HDR control signals between diagonally located pixel circuits, the invention is not so limited. Thus, a single control signal can be used to control what was previously controlled by a plurality of separate signals. Accordingly, the invention is not to be considered as limited by the foregoing description but is only limited by the scope of the claims.

What is claimed as new and desired to be protected by Letters Patent of the United States is:

1. A pixel array, comprising:
    a first pixel circuit located in a first row and a first column of said pixel array; and
    a second pixel circuit located in a second row and a second column of said pixel array,
    said first and second pixel circuits sharing DCG/HDR circuitry, wherein said shared DCG/HDR circuitry comprises:
        a high dynamic range circuit located in said second row and said second column;
        a dual conversion gain circuit located in said second row and said second column of the pixel array, the dual conversion gain circuit is coupled to a first floating diffusion region of the first pixel circuit located in the first row and first column; and
        a common control line coupled to the high dynamic range circuit and the dual conversion gain circuit for providing control signals to both the high dynamic range circuit and the dual conversion gain circuit,
    wherein, when said common control line is enabled, a charge of the first floating diffusion region located in the first row and the first column is read out and stored in a capacitor of the dual conversion gain circuit located in the second row and the second column.

2. The pixel array of claim 1, wherein said first pixel circuit further comprises first and second pixel cells.

3. The pixel array of claim 2, wherein said first and second pixel cells include first and second photo-conversion devices, respectively.

4. The pixel array of claim 2, wherein said first and said second pixel circuits are in different rows of the pixel array.

5. The pixel array of claim 2, wherein said first and said second pixel circuits are in different columns of the pixel array.

6. The pixel array of claim 2, wherein said first pixel circuit is one column away from and one row away from said second pixel circuit.

7. The pixel array of claim 2, wherein said first floating diffusion region is shared by said first and second pixel cells of said first pixel circuit.

8. The pixel array of claim 2, wherein said first pixel circuit further comprises readout circuitry shared by said first and second pixel cells of said first pixel circuit.

9. The pixel array of claim 8, wherein said readout circuitry comprises a row select gate and a source-follower gate.

10. A method of reading from a pixel array, comprising the step of:
    pulsing a control signal connected to a first pixel circuit and a second pixel circuit, said control signal controls a high dynamic range circuit of said first pixel circuit located in a first row and a first column of the pixel array and a dual conversion gain circuit of said second pixel circuit located in a second row and a second column of the pixel array, the high dynamic range circuit and the dual conversion gain circuit both located in the first row and the first column of the pixel array, the dual conversion gain circuit comprising a capacitor and a dual conversion gain transistor, the high dynamic range circuit comprising a high dynamic range transistor,
    wherein said control signal activates the dual conversion gain transistor of the dual conversion gain circuit of said second pixel circuit and couples a photo-conversion device in said second pixel circuit to a floating diffusion region in said second pixel circuit and to the capacitor of the dual conversion gain circuit of said second pixel circuit.

11. The method of claim 10, wherein said first and said second pixel circuits are in different rows of the pixel array.

12. The method of claim 10, wherein said first and said second pixel circuits are in different columns of the pixel array.

13. The method of claim 10, wherein said first pixel circuit is one column away from and one row away from said second pixel circuit.

14. A method of reading from a pixel array, comprising the steps of:
    applying a reset voltage to a first pixel circuit;
    pulsing a first control signal of said first pixel circuit and a second pixel circuit, said first control signal controls a high dynamic range circuit of said first pixel circuit located in a first row and a first column of the pixel array and a dual conversion gain circuit of said second pixel circuit located diagonal to the first pixel circuit in a second row and a second column of the pixel array, the high dynamic range circuit and the dual conversion gain circuit both located in the first row and the first column of the pixel array, the dual conversion gain circuit comprising a capacitor and a dual conversion gain transistor, the high dynamic range circuit comprising a high dynamic range transistor,
    wherein said first control signal closes the dual conversion gain transistor of the dual conversion gain circuit of said second pixel circuit and couples a photo-conversion device in said second pixel circuit to a floating diffusion region in said second pixel circuit and to the capacitor of the dual conversion gain circuit of said second pixel circuit; and
    reading a reset signal from said first pixel circuit.

15. The method of claim 14, further comprising the step of storing said reset signal in a storage area.

16. The method of claim 15, further comprising the steps of:
    reading out a charge signal from said first pixel circuit; and
    storing said charge signal in a second storage area.

17. The method of claim 15, further comprising the steps of:
    pulsing said first control signal of said first pixel circuit;
    reading out a second charge signal from said first pixel circuit, wherein said second charge signal is a dual conversion gain signal; and
    storing said second charge signal in a third storage area.

18. A method of reading from a pixel array, comprising the steps of:

pulsing a first control signal of a first pixel circuit and a second pixel circuit, said first control signal controls a high dynamic range circuit of said first pixel circuit located in a first row and a first column of the pixel array and a dual conversion gain circuit of said second pixel circuit located in a different row and column from said first row and column, the high dynamic range circuit and the dual conversion gain circuit both located in the first row and the first column of the pixel array, the dual conversion gain circuit comprising a capacitor and a dual conversion gain transistor, the high dynamic range circuit comprising a high dynamic range transistor, wherein said first control signal activates the dual conversion gain transistor of the dual conversion gain circuit of the first pixel circuit and couples a photo-conversion device in said second pixel circuit to a floating diffusion region in said second pixel circuit and to the capacitor of the dual conversion gain circuit of the second pixel circuit;

storing a reset signal from said first pixel circuit;

storing a first charge signal from said first pixel circuit; and storing a second charge signal from said first pixel circuit.

19. The method of claim 18 further comprising the step of comparing said first charge signal with a threshold value.

20. The method of claim 19 further comprising the step of selectively combining said reset signal, said first charge signal, and said second charge signal.

21. The method of claim 19 further comprising the step of combining said reset signal with said second charge signal if said first charge signal is greater than a threshold value.

22. The method of claim 20 further comprising the step of combining said reset signal with said first charge signal if said first charge signal is not greater than a threshold value.

23. An integrated circuit, comprising:

a pixel array, comprising:

a control line, coupled to a second pixel circuit having a high dynamic range circuit located in a second row and a second column of the pixel array and to a first pixel circuit, located diagonal to the second pixel circuit in a first row and a first column of the pixel array, having a dual conversion gain circuit located in the second row and the second column of the pixel array, for providing a common control signal to both the dual conversion gain circuit and the high dynamic range circuit, the dual conversion gain circuit comprising a capacitor and a dual conversion gain transistor, the high dynamic range circuit comprising a high dynamic range transistor, wherein, when the control line is enabled, a charge of a floating diffusion region associated with the first pixel circuit and located in the first row and the first column is read out and stored in the capacitor of the dual conversion gain circuit located in the second row and the second column.

24. The integrated circuit of claim 23, wherein said first pixel circuit includes first and second pixel cells.

25. The integrated circuit of claim 24, wherein said first and second pixel cells each include a photo-conversion device.

26. The integrated circuit of claim 25, wherein said floating diffusion region associated with said first pixel circuit is shared by said first and second pixel cells of said first pixel circuit.

27. The integrated circuit of claim 25, wherein said first pixel circuit further comprises readout circuitry shared by said first and second pixel cells of said first pixel circuit.

28. The integrated circuit of claim 27, wherein said readout circuitry comprises a row select gate and a source-follower gate.

29. An imaging system, comprising:

an imager device, comprising:

a pixel array, comprising:

a control line, coupled to a second pixel circuit having a high dynamic range circuit located in a second row and a second column of the pixel array and to a first pixel circuit, located diagonal to the second pixel circuit in a first row and a first column of the pixel array, having a dual conversion gain circuit located in the second row and the second column of the pixel array, for providing a common control signal to both the dual conversion gain circuit and the high dynamic range circuit, the dual conversion gain circuit comprising a capacitor and a dual conversion gain transistor, the high dynamic range circuit comprising a high dynamic range transistor, wherein, when the control line is enabled, a charge of a floating diffusion region associated with the first pixel circuit and located in the first row and the first column is read out and stored in the capacitor of the dual conversion gain circuit located in the second row and the second column.

30. The imaging system of claim 29, wherein said first pixel circuit includes first and second pixel cells.

31. The imaging system of claim 30, wherein said first and second pixel cells each include a photo-conversion device.

32. The imaging system of claim 31, wherein said floating diffusion region associated with said first pixel circuit is shared by said first and second pixel cells of said first pixel circuit.

33. The imaging system of claim 31, wherein said first pixel circuit further comprises readout circuitry shared by said first and second pixel cells of said first pixel circuit.

34. The imaging system of claim 33, wherein said readout circuitry comprises a row select gate and a source-follower gate.

35. A processor system, comprising:

a processor; and an imager, comprising:

a pixel array, comprising:

a control line, coupled to a second pixel circuit having a high dynamic range circuit located in a second row and a second column of the pixel array and to a first pixel circuit, located diagonal to the second pixel circuit in a first row and a first column of the pixel array, having a dual conversion gain circuit located in the second row and the second column of the pixel array, for providing a common control signal to both the dual conversion gain circuit and the high dynamic range circuit, the dual conversion gain circuit comprising a capacitor and a dual conversion gain transistor, the high dynamic range circuit comprising a high dynamic range transistor, wherein, when the control line is enabled, a charge of a floating diffusion region associated with the first pixel circuit and located in the first row and the first column is read out and stored in the capacitor of the dual conversion gain circuit located in the second row and the second column.

36. The processor system of claim 35, wherein said first pixel circuit includes first and second pixel cells.

37. The processor system of claim 36, wherein said first and second pixel cells each include a photo-conversion device.

38. The processor system of claim 36, wherein said floating diffusion region associated with said first pixel circuit is shared by said first and second pixel cells of said first pixel circuit.

39. The processor system of claim 36, wherein said first pixel circuit further comprises readout circuitry shared by said first and second pixel cells of said first pixel circuit.

40. The processor system of claim 39, wherein said readout circuitry comprises a row select gate and a source-follower gate.

* * * * *